US010813050B1

(12) United States Patent
Tham et al.

(10) Patent No.: US 10,813,050 B1
(45) Date of Patent: *Oct. 20, 2020

(54) WEARABLE DEVICE LOCATION SYSTEMS

(71) Applicant: Snap Inc., Santa Monica, CA (US)

(72) Inventors: Yu Jiang Tham, Los Angeles, CA (US); John James Robertson, Los Angeles, CA (US); Gerald Nilles, Culver City, CA (US); Jason Heger, Louisville, CO (US); Praveen Babu Vadivelu, Broomfield, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,898

(22) Filed: Dec. 27, 2019

Related U.S. Application Data

(63) Continuation of application No. 16/426,909, filed on May 30, 2019, now Pat. No. 10,560,898.

(51) Int. Cl.
*H04W 52/02* (2009.01)
*G01S 19/48* (2010.01)
*H04B 1/3827* (2015.01)
*H04W 4/029* (2018.01)

(52) U.S. Cl.
CPC ......... *H04W 52/0261* (2013.01); *G01S 19/48* (2013.01); *H04B 1/385* (2013.01); *H04B 2001/3866* (2013.01); *H04W 4/029* (2018.02)

(58) Field of Classification Search
CPC .. H04W 52/0261; H04W 4/029; H04B 1/385; H04B 2001/3866; G01S 19/48
See application file for complete search history.

(56) References Cited

U.S. PATENT DOCUMENTS

| 9,678,338 | B1 | 6/2017 | Bamberger et al. |
| 10,560,898 | B1 | 2/2020 | Tham et al. |
| 2006/0238417 | A1 | 10/2006 | Jendbro et al. |
| 2009/0200367 | A1 | 8/2009 | Arnouse |

(Continued)

OTHER PUBLICATIONS

"U.S. Appl. No. 16/426,909, Notice of Allowance dated Sep. 24, 2019", 11 pgs.

(Continued)

*Primary Examiner* — Nizar N Sivji
(74) *Attorney, Agent, or Firm* — Schwegman Lundberg & Woessner, P.A.

(57) ABSTRACT

Systems, methods, devices, computer readable media, and other various embodiments are described for location management processes in wearable electronic devices. Performance of such devices is improved with reduced time to first fix of location operations in conjunction with low-power operations. In one embodiment, low-power circuitry manages high-speed circuitry and location circuitry to provide location assistance data from the high-speed circuitry to the low-power circuitry automatically on initiation of location fix operations as the high-speed circuitry and location circuitry are booted from low-power states. In some embodiments, the high-speed circuitry is returned to a low-power state prior to completion of a location fix and after capture of content associated with initiation of the location fix. In some embodiments, high-speed circuitry is booted after completion of a location fix to update location data associated with content.

16 Claims, 13 Drawing Sheets

(56) References Cited

U.S. PATENT DOCUMENTS

| | | | |
|---|---|---|---|
| 2011/0037767 A1* | 2/2011 | Casanova | H04L 51/10 |
| | | | 345/473 |
| 2011/0102257 A1 | 5/2011 | Spyropoulos et al. | |
| 2013/0244686 A1* | 9/2013 | Saha | G06F 1/3206 |
| | | | 455/456.1 |
| 2014/0244770 A1* | 8/2014 | Kim | H04L 51/32 |
| | | | 709/206 |
| 2015/0102960 A1* | 4/2015 | Asrani | G01S 19/48 |
| | | | 342/357.31 |

OTHER PUBLICATIONS

"International Application Serial No. PCT/US2019/069103, International Search Report dated Apr. 15, 2020", 4 pgs.
"International Application Serial No. PCT/US2019/069103, Written Opinion dated Apr. 15, 2020", 7 pgs.

* cited by examiner

WEARABLE DEVICE LOCATION SYSTEMS

PRIORITY CLAIM

This application is a continuation of and claims the benefit of priority of U.S. patent application Ser. No. 16/426,909, filed May 30, 2019, which is hereby incorporated by reference herein in its entirety.

TECHNICAL FIELD

Embodiments of the present disclosure relate generally to mobile computing technology and wearable device technology and, more particularly, but not by way of limitation, to methods and devices with location services in power and computing resource limited environments.

BACKGROUND

Wearable devices such as glasses and watches come in many forms, but have limited space for circuitry and power. Nevertheless, the form factor and habitual use of wearable products provide benefits separate from targeted single function devices. Because of this, wearable devices such as wristbands, glasses, and other such devices with limited form factors continue to include additional functionality. Even so, limits in space and power resources drive continual innovation in the wearable device space.

BRIEF DESCRIPTION OF THE SEVERAL VIEWS OF THE DRAWINGS

Various ones of the appended drawings merely illustrate example embodiments of the present disclosure and should not be considered as limiting its scope.

DETAILED DESCRIPTION

Figure 1:
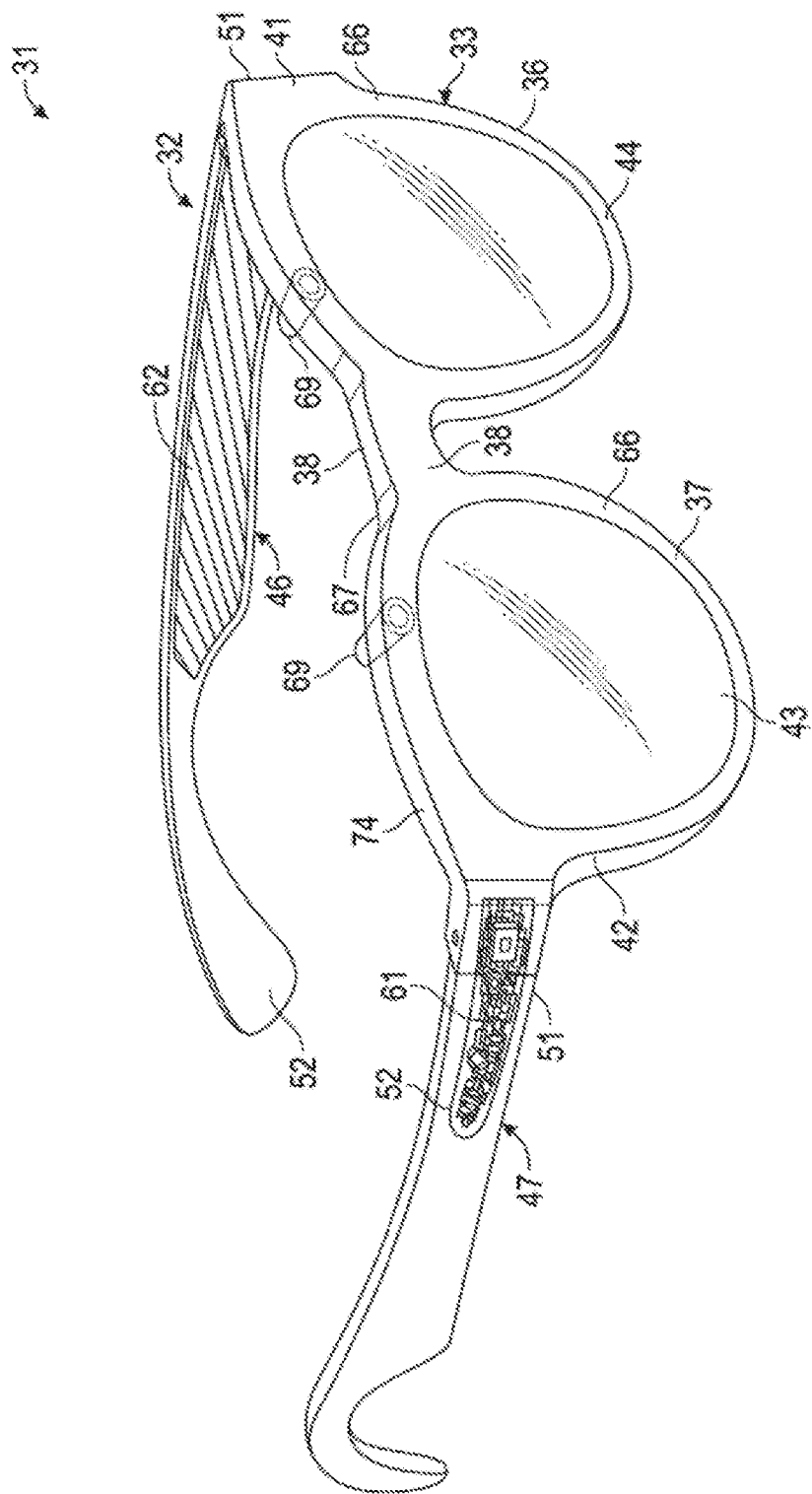
FIG. 1 illustrates a wearable device for use in accordance with various embodiments described herein.

Embodiments described herein relate to mobile computing technology and wearable health technology and, more particularly, but not by way of limitation, to methods and devices for enabling location data for content generated using a wearable device with significant computing resource limitations (e.g. battery power).

For example, when a wearable device is used to generate images or video clips, it is desirable to add context to this data with location tagging. In order to effectively provide this location data, location aware hardware is needed to provide a reasonably consistent set of data to the content generated at a wearable device. At the same time, wearable devices include significant limitations in terms of the space available to enable features such as location services. This is particularly true for standard location services which may be configured to constantly update a device location. Power limitations for wearable devices, however, make constant location updates unfeasible. Embodiments described herein thus provide improvements to wearable devices by reducing resources needed to provide location data for content generated by a wearable camera device. This improved device performance is provided by a combination of efficient use of location circuitry, use of supporting data to reduce the time for an initial location fix, and merging of location data from other sources in order to allow the limited power efficient location data from a wearable device combined with data from other sources to provide consistent location data for images and video clips.

In some embodiments, the operation of wearable devices is improved by the use of a combination of high-speed circuitry, low-power circuitry, and location circuitry. The low-power circuitry manages the booting of the high-speed circuitry in the location circuitry in order to minimize the power usage, since the high-speed circuitry and location circuitry consume more power. Further, in order to minimize the power usage by the location circuitry, support data to reduce a time to first fix by the location circuitry is automatically communicated from the high-speed circuitry to the location circuitry when the device initiates a location fix. Low-power circuitry returns high-speed circuitry and location circuitry to low-power state whenever possible.

Additionally, rather than continually updating a location of a wearable device, location fix is only initiated when a trigger event occurs or on a periodic basis. For example, a location fix may be attempted every 15 or 30 minutes when circuitry on the wearable device determines that the device is being worn. A worn state determination may be based on peripheral sensors, such as an inertial measurement unit or an ambient light sensor. In some embodiments, a neural network operating on low-power circuitry may implement a worn state determination using inputs from such sensors. If the device is not being worn (e.g. not associated with a worn state), no location fixes will be attempted. Low-power neural network circuitry may be part of low-power circuitry in order to enable a determination of whether a device is being worn. Such operations may use simple motion data or light sensing data from sensors on a wearable device in order to make this determination. A trigger event may be the receipt of an input to capture an image or video clip. Once such an input is received, the wearable device may initiate location fix. If the device is unable to determine location, a previous set of location data from a previous fix may be used for the captured data. When the captured content is later downloaded to the client device such as an associated cell phone, the client device may determine if more accurate location data is available from location data captured by the client device. Location data associated with the content may then be updated at the client device.

Various additional details and combinations of embodiments for improving the operation of wearable devices with location data generated with low-power usage are described in detail below.

FIG. 1 illustrates aspects of an example embodiments of a wearable electronic device implementing various disclosed embodiments, the electronic device being in the example form of an article of eyewear constituted by electronics-enabled glasses 31, which may further operate within a network system for communicating image and video content with associated location information. FIG. 1 shows a front perspective view of the glasses 31. The glasses 31 can include a frame 32 made from any suitable material such as plastic or metal, including any suitable shape memory alloy. The frame 32 can have a front piece 33 that can include a first or left lens, display, or optical element holder 36 and a second or right lens, display, or optical element holder 37 connected by a bridge 38. The front piece 33 additionally includes a left end portion 41 and a right end portion 42. A first or left optical element 44 and a second or right optical element 43 can be provided within respective left and right optical element holders 36, 37. Each of the optical elements 43, 44 can be a lens, a display, a display assembly, or a combination of the foregoing. In some embodiments, for example, the glasses 31 are provided with an integrated near-eye display mechanism that enables, for example, display to the user of preview images for visual media captured by cameras 69 of the glasses 31.

The frame 32 additionally includes a left arm or temple piece 46 and a right arm or temple piece 47 coupled to the respective left and right end portions 41, 42 of the front piece 33 by any suitable means such as a hinge (not shown), so as to be coupled to the front piece 33, or rigidly or fixably secured to the front piece 33 so as to be integral with the front piece 33. Each of the temple pieces 46 and 47 can include a first portion 51 that is coupled to the respective end portion 41 or 42 of the front piece 33 and any suitable second portion 52, such as a curved or arcuate piece, for coupling to the ear of the user. In one embodiment, the front piece 33 can be formed from a single piece of material, so as to have a unitary or integral construction. In one embodiment, the entire frame 32 can be formed from a single piece of material so as to have a unitary or integral construction.

The glasses 31 can include a computing device, such as a computer 61, which can be of any suitable type so as to be carried by the frame 32 and, in one embodiment, of a suitable size and shape, so as to be at least partially disposed in one of the temple pieces 46 and 47. In one embodiment, as illustrated in FIG. 16, the computer 61 has a size and shape similar to the size and shape of one of the temple pieces 46, 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. The computer 61 comprises low-power circuitry, high-speed circuitry, location circuitry, and a display processor. Various other embodiments may include these elements in different configurations or integrated together in different ways. Additional details of aspects of the computer 61 may be implemented as described with reference to the description that follows.

The computer 61 additionally includes a battery 62 or other suitable portable power supply. In one embodiment, the battery 62 is disposed in one of the temple pieces 46 or 47. In the glasses 31 shown in FIG. 1, the battery 62 is shown as being disposed in the left temple piece 46 and electrically coupled using a connection 74 to the remainder of the computer 61 disposed in the right temple piece 47. One or more input and output devices can include a connector or port (not shown) suitable for charging a battery 62 accessible from the outside of the frame 32, a wireless receiver, transmitter, or transceiver (not shown), or a combination of such devices.

The glasses 31 include digital cameras 69. Although two cameras 69 are depicted, other embodiments contemplate the use of a single or additional (i.e., more than two) cameras 69. For ease of description, various features relating to the cameras 69 will further be described with reference to only a single camera 69, but it will be appreciated that these features can apply, in suitable embodiments, to both cameras 69.

In various embodiments, the glasses 31 may include any number of input sensors or peripheral devices in addition to the cameras 69. The front piece 33 is provided with an outward-facing, forward-facing, front, or outer surface 66 that faces forward or away from the user when the glasses 31 are mounted on the face of the user, and an opposite inward-facing, rearward-facing, rear, or inner surface 67 that faces the face of the user when the glasses 31 are mounted on the face of the user. Such sensors can include inward-facing video sensors or digital imaging modules such as cameras 69 that can be mounted on or provided within the inner surface 67 of the front piece 33 or elsewhere on the frame 32 so as to be facing the user, and outward-facing video sensors or digital imaging modules such as the cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, accelerometers, or any other such sensors.

The glasses 31 further include an example embodiment of a camera control mechanism or user input mechanism comprising a camera control button mounted on the frame 32 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 32 adjacent to its surface for detecting the presence of a user's finger, to dispose the touch-sensitive button to the engaged condition when the user touches a finger to the corresponding spot on the outer surface 66 of the frame 32. It will be appreciated that the above-described camera control button and capacitive touch button are but two examples of a haptic input mechanism for single-action control of the camera 69, and that other embodiments may employ different single-action haptic control arrangements.

Figure 2:
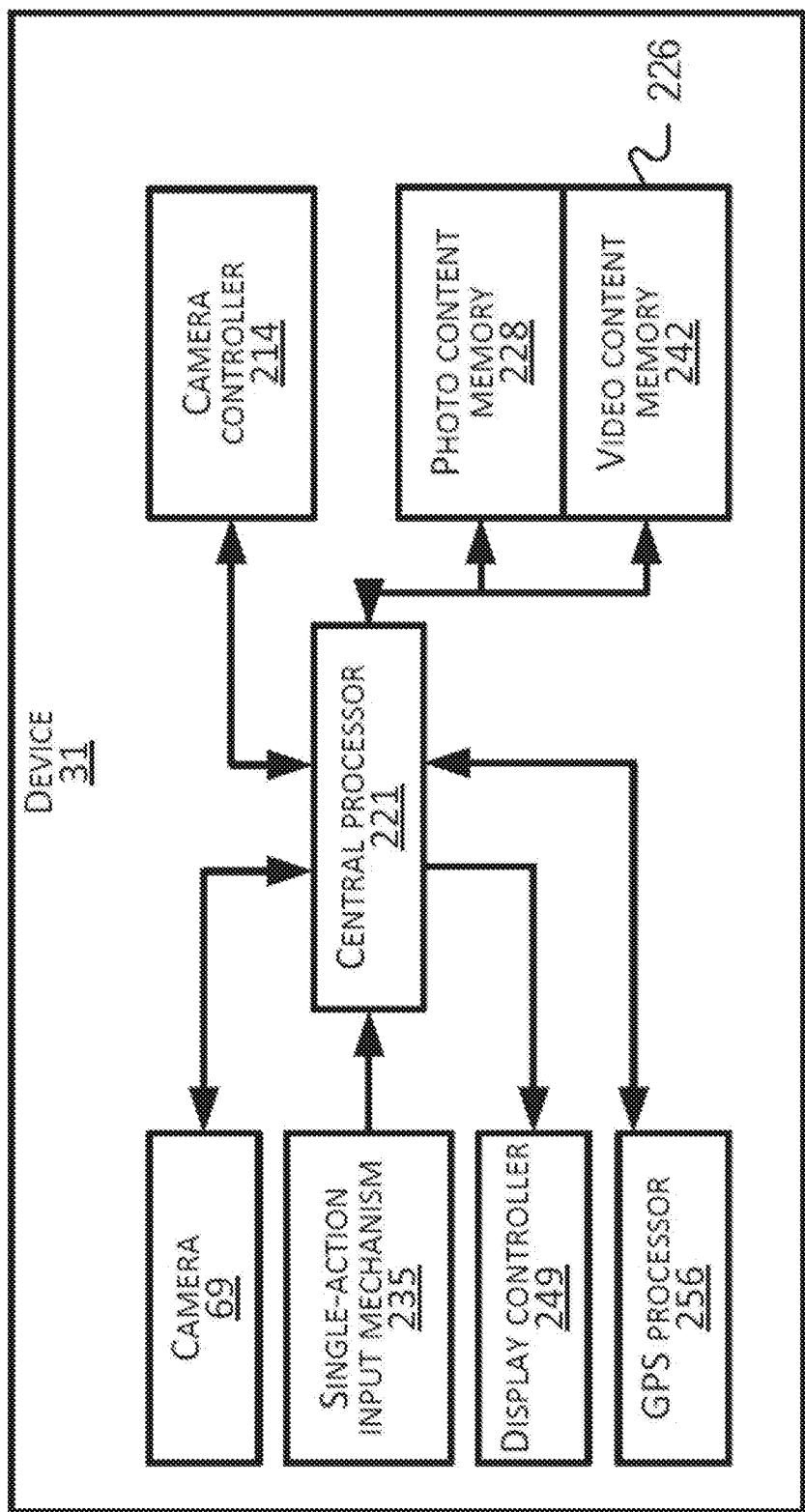
FIG. 2 illustrates aspects of a wearable device, in accordance with some embodiments described herein.

FIG. 2 is a schematic diagram illustrating some of the components of the example electronic device in the form of the glasses 31. Note that a corresponding arrangement of interacting machine components can apply to embodiments in which an electronic device consistent with the disclosure comprises, for example, a mobile electronic device such as a wearable device (e.g., the glasses 31), a smartphone, a tablet, or a digital camera. The computer 61 of the glasses 31 includes a central processor 221 in communication with an onboard memory 226. The central processor 221 may be a central processing unit and/or a graphics processing unit. The memory 226 in this example embodiment comprises a combination of flash memory and random-access memory. Device 31 of FIG. 2 further includes GPS processor 256. While GPS processor 256 is referred to as global positioning system (GPS), any location system or global navigation satellite system (GNSS) support circuitry may be used in various embodiments as part of the elements referred to herein as GPS systems, location systems, location circuitry, location circuits, location or GPS processors 256, or other such terms. As described herein, such devices are used to perform location operations or location "fix" operations to estimate a current location of a device. Further, a "time to first fix" refers to the time from initiating a location operation to generating associated location data. A successful location fix results in a set of data associated with a location, though such data may have significant associated uncertainty. Various embodiments described herein may use tradeoffs of accuracy against power consumption and a time to first fix to further reduce power usage of location operations in a wearable device. Further still, rather than continuing location operations when the circuitry is unable to determine a location, embodiments herein may use a relatively low timeout threshold to limit power usage when a wearable device is in an environment where location data is unavailable or difficult to determine. Such environments may occur in an indoor location or where obstructions prevent the location circuitry from accessing relevant satellite information. Rather than consuming power, a timeout (e.g. 30 seconds, 60 seconds, two minutes) may be used to limit the resources spent in attempting to generate location data. Instead, embodiments herein may simply provide a location fail or timeout response, and rely on a previous location fix or location data from another device (e.g. a paired client or phone device) to provide location data. Alternatively or additionally, device may prompt a user to input an estimated location when location data is not available via the automatic (e.g. GNSS) location systems.

The glasses 31 further include a camera controller 214 in communication with the central processor 221 and the camera 69. The camera controller 214 comprises circuitry configured to control recording of either photographic content or video content based upon processing of control signals received from the single-action input mechanism (indicated generally by a single-action input mechanism 235 in FIG. 2) that includes the camera control button, and to provide for automatic adjustment of one or more image-capture parameters pertaining to capturing of image data by the camera 69 and on-board processing of the image data prior to persistent storage thereof and/or to presentation thereof to the user for viewing or previewing.

In some embodiments, the camera controller 214 comprises permanently configured circuitry, such as firmware or an application-specific integrated circuit (ASIC) configured to perform the various functions described herein. In other embodiments, the camera controller 214 may comprise a dynamically reconfigurable processor executing instructions that temporarily configure the processor to execute the various functions described herein.

The camera controller 214 interacts with the memory 226 to store, organize, and present image content in the form of photo content and video content. To this end, the memory 226, in this example embodiment, comprises a photo content memory 228 and a video content memory 242. The camera controller 214 is thus, in cooperation with the central processor 221, configured to receive, from the camera 69, image data representative of digital images captured by the camera 69 in accordance with some of the image-capture parameters, to process the image data in accordance with some of the image-capture parameters, and to store the processed image data in an appropriate one of the photo content memory 228 and the video content memory 242.

The camera controller 214 is further configured to cooperate with a display controller 249 to cause display on a display mechanism incorporated in the glasses 31 of selected photos and videos in the memory 226, and thus to provide previews of captured photos and videos. In some embodiments, the camera controller 214 will manage processing of images captured using automatic bracketing parameters for inclusion in a video file.

The single-action input mechanism 235 is communicatively coupled to the central processor 221 and the camera controller 214 to communicate signals representative of a current state of the camera control button, and thereby to communicate to the camera controller 214 whether or not the camera control button is currently being pressed. The camera controller 214 further communicates with the central processor 221 regarding the input signals received from the single-action input mechanism 235. In one embodiment, the camera controller 214 is configured to process input signals received via the single-action input mechanism 235 to determine whether a particular user engagement with the camera control button is to result in a recording of video content or photographic content, and/or to dynamically adjust one or more image-capture parameters based on processing of the input signals. For example, pressing of the camera control button for longer than a predefined threshold duration causes the camera controller 214 automatically to apply relatively less rigorous video processing to captured video content prior to persistent storage and display thereof. Conversely, pressing of the camera control button for shorter than the threshold duration in such an embodiment causes the camera controller 214 automatically to apply relatively more rigorous photo stabilization processing to image data representative of one or more still images.

The glasses 31 may further include various components common to mobile electronic devices such as smart glasses or smart phones, for example including a display controller 249 for controlling display of visual media (including photographic and video content captured by the camera 69) on a display mechanism incorporated in the device. Note that the schematic diagram of FIG. 2 is not an exhaustive representation of all components forming part of the glasses 31.

Figure 3:
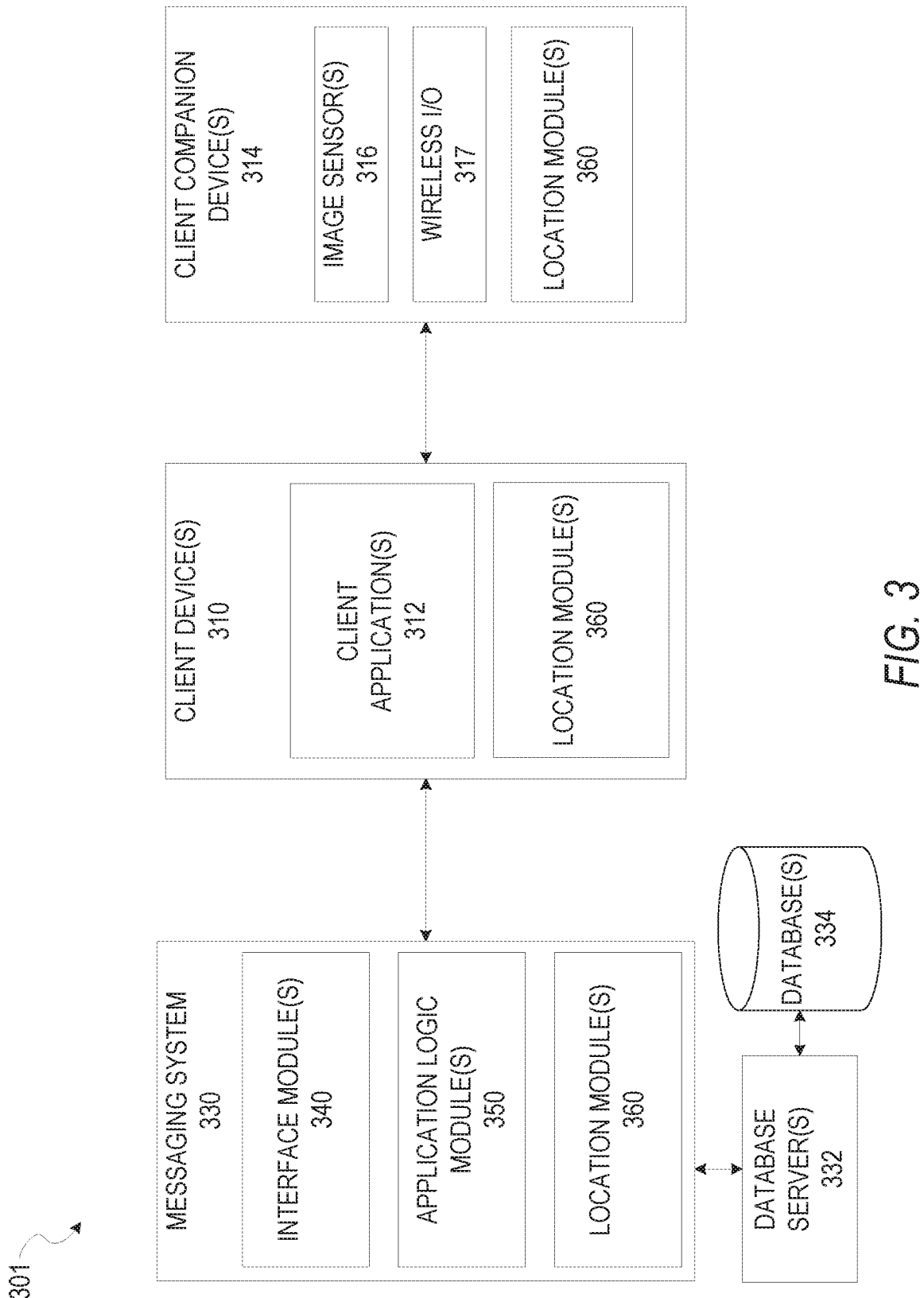
FIG. 3 illustrates aspects of a system for wearable device operation, in conjunction with associated client devices and supporting systems, in accordance with some embodiments.

FIG. 3 illustrates an alternative network system 301 that may be used with certain embodiments. The network system 301 includes a messaging system 330 with interface modules 340, application logic modules 350, database servers 332, and databases 334, as well as client devices 310 operating client applications 312. The network system 301, however, additionally includes wearable client companion devices 314 connected to the client devices 310. In various embodiments, the wearable client companion device 314 is configured for wired communication with either the client device 310 or the messaging system 330. The client companion device 314 may also be simultaneously configured for wireless communication with the client device 310, the messaging system 330, or both. The client companion devices 314 may be wearable devices such as glasses 31, visors, watches, or other network-enabled items. The client companion devices 314 may also be any device described herein that accesses a network via another device such as the client device 310. The client companion devices 314 include image sensors 316, wireless input and output (I/O) 317, and elements of a location system 360 (e.g., for assigning general capture area information to content captured using client companion device(s) 314). The client companion devices 314 may include one or more processors, a display, a battery 62, and a memory, but may have limited processing and memory resources. In such embodiments, the client device 310 and/or server computing devices used for the messaging system 330 may provide assistance with both improved time to first fix performance of location modules 360 operating on devices 314, as well as supporting supplemental location information in case location information provided by devices 314 is not available or is less accurate than other available information from the associated client device 310. In one embodiment, for example, the client companion device 314 may be a pair of network-enabled glasses, such as the glasses 31 of FIG. 1, and the client device 310 may be a smartphone that enables access to the messaging system 330 to enable communication of video content captured with the image sensor(s) 316.

Figure 4:
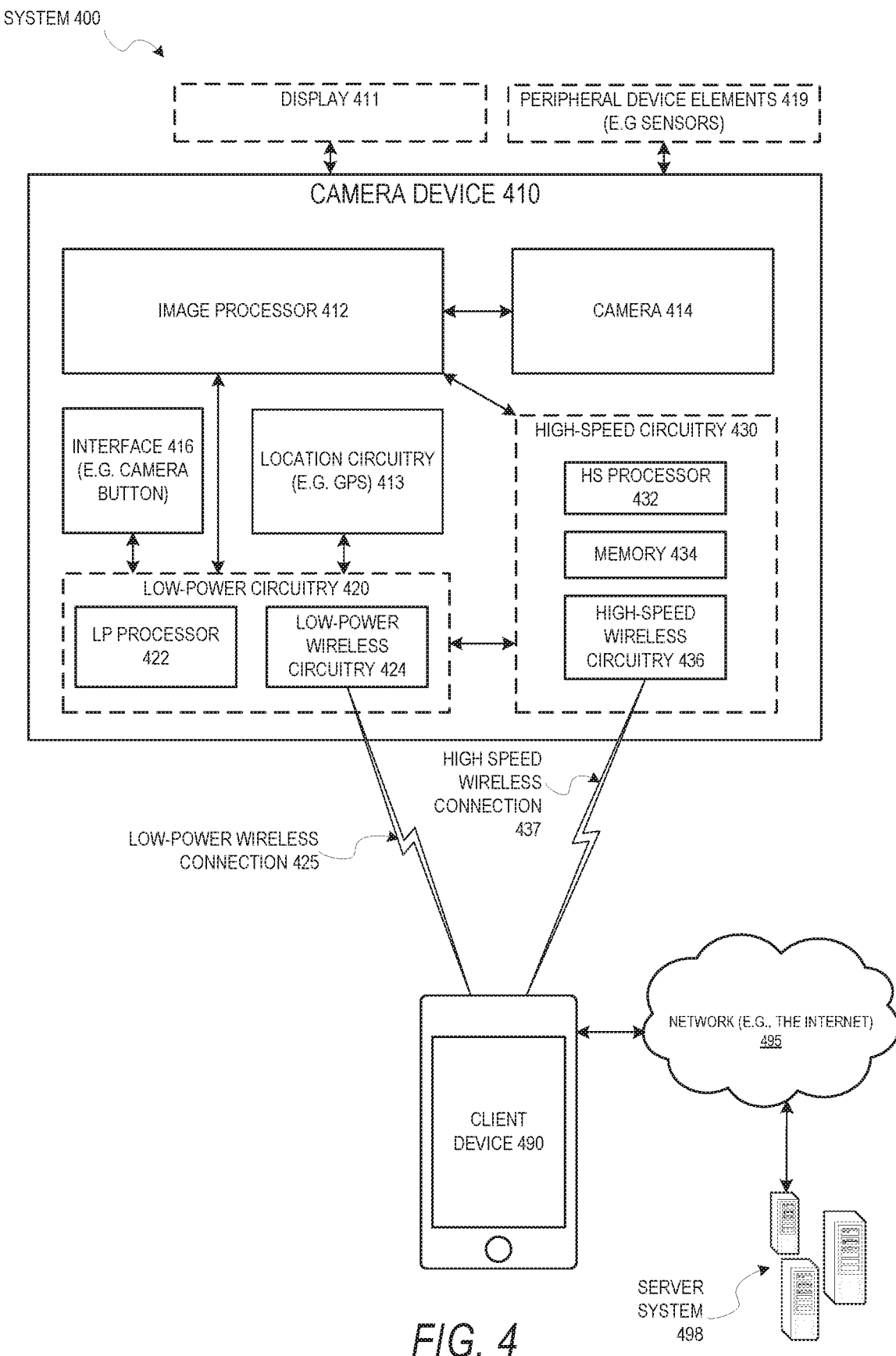
FIG. 4 illustrates aspects of a wearable device, in accordance with some embodiments described herein.

FIG. 4 is a block diagram illustrating a networked system 400 including details of a camera device 410, according to some example embodiments. In certain embodiments, camera device 410 may be implemented in glasses 31 of FIG. 1 described above.

System 400 includes camera device 410, client device 490, and server system 498. Client device 490 may be a smartphone, tablet, phablet, laptop computer, access point, or any other such device capable of connecting with camera device 410 using both a low-power wireless connection 425 and a high-speed wireless connection 437. Client device 490 is connected to server system 498 and network 495. The network 495 may include any combination of wired and wireless connections. Server system 498 may be one or more computing devices as part of a service or network computing system.

System 400 may optionally include additional peripheral device elements 419 and/or a display 411 integrated with camera device 410. Such peripheral device elements 419 may include biometric sensors, additional sensors, or display elements integrated with camera device 410. Examples of peripheral device elements 419 are discussed further with respect to FIGS. 12 and 13. For example, peripheral device elements 419 may include motion detectors, light detectors, any I/O components including output components, 1352 motion components 1358, or any other such elements described herein.

Camera device 410 includes camera 414, image processor 412, interface 416, low-power circuitry 420, and high-speed circuitry 430. Camera 414 includes digital camera elements such as a charge coupled device, a lens, or any other light capturing elements that may be used to capture data as part of camera 414.

Interface 416 refers to any source of a user command that is provided to camera device 410. In one implementation, interface 416 is a physical button on a camera 414 that, when depressed, sends a user input signal from interface 416 to low-power processor 422. A depression of such a camera button followed by an immediate release may be processed by low-power processor 422 as a request to capture a single image. A depression of such a camera button for a first period of time may be processed by low-power processor 422 as a request to capture video data while the button is depressed, and to cease video capture when the button is released, with the video captured while the button was depressed stored as a single video file. In certain embodiments, the low-power processor 422 may have a threshold time period between the press of a button and a release, such as 500 milliseconds or one second, below which the button press and release is processed as an image request, and above which the button press and release is interpreted as a video request. The low-power processor 422 may make this determination while the image processor 412 is booting. In other embodiments, the interface 416 may be any mechanical switch or physical interface capable of accepting user inputs associated with a request for data from the camera 414. In other embodiments, the interface 416 may have a software component, or may be associated with a command received wirelessly from another source.

Image processor 412 includes circuitry to receive signals from the camera 414 and process those signals from the camera 414 into a format suitable for storage in the memory 434. Image processor 412 is structured within camera device 410 such that it may be powered on and booted under the control of low-power circuitry 420. Image processor 412 may additionally be powered down by low-power circuitry 420. Depending on various power design elements associated with image processor 412, image processor 412 may still consume a small amount of power even when it is in an off state. This power will, however, be negligible compared to the power used by image processor 412 when it is in an on state, and will also have a negligible impact on battery life. As described herein, device elements in an "off" state are still configured within a device such that low-power processor 422 is able to power on and power down the devices. A device that is referred to as "off" or "powered down" during operation of camera device 410 does not necessarily consume zero power due to leakage or other aspects of a system design.

In one example embodiment, image processor 412 comprises a microprocessor integrated circuit (IC) customized for processing sensor data from camera 414, along with volatile memory used by the microprocessor to operate. In order to reduce the amount of time that image processor 412 takes when powering on to processing data, a non-volatile read only memory (ROM) may be integrated on the IC with instructions for operating or booting the image processor 412. This ROM may be minimized to match a minimum size needed to provide basic functionality for gathering sensor data from camera 414, such that no extra functionality that would cause delays in boot time are present. The ROM may be configured with direct memory access (DMA) to the volatile memory of the microprocessor of video processor 412. DMA allows memory-to-memory transfer of data from the ROM to system memory of the video processor 412 independently of operation of a main controller of video processor 412. Providing DMA to this boot ROM further reduces the amount of time from power on of the image processor 412 until sensor data from the camera 414 can be processed and stored. In certain embodiments, minimal processing of the camera signal from the camera 414 is performed by the image processor 412, and additional processing may be performed by applications operating on the client device 490 or server system 498.

Low-power circuitry 420 includes low-power processor 422 and low-power wireless circuitry 424. These elements of low-power circuitry 420 may be implemented as separate elements or may be implemented on a single IC as part of a system on a single chip. Low-power processor 422 includes logic for managing the other elements of the camera device 410. As described above, for example, low-power processor 422 may accept user input signals from an interface 416. Low-power processor 422 may also be configured to receive input signals or instruction communications from client device 490 via low-power wireless connection 425. Additional details related to such instructions are described further below. Low-power wireless circuitry 424 includes circuit elements for implementing a low-power wireless communication system. Bluetooth™ Smart, also known as Bluetooth™ low energy, is one standard implementation of a low-power wireless communication system that may be used to implement low-power wireless circuitry 424. In other embodiments, other low-power communication systems may be used.

Location circuitry 213 includes specialized processing circuitry for implementing location services as described above. For example, location circuitry 213 may include a circuit for accessing GNSS or GPS data in conjunction with supporting information such as satellite almanac binary data in order to generate positioning data for device 210 (e.g. glasses 31) when such data is not available from a paired client device 490.

High-speed circuitry 430 includes high-speed processor 432, memory 434, and high-speed wireless circuitry 436. High-speed processor 432 may be any processor capable of managing high-speed communications and operation of any general computing system needed for camera device 410. High-speed processor 432 includes processing resources needed for managing high-speed data transfers on high-speed wireless connection 437 using high-speed wireless circuitry 436. In certain embodiments, the high-speed processor 432 executes an operating system such as a LINUX operating system or other such operating system such as operating system 904 of FIG. 9. In addition to any other responsibilities, the high-speed processor 432 executing a software architecture for the camera device 410 is used to manage data transfers with high-speed wireless circuitry 436. In certain embodiments, high-speed wireless circuitry 436 is configured to implement Institute of Electrical and Electronic Engineers (IEEE) 802.11 communication standards, also referred to herein as Wi-Fi. In other embodiments, other high-speed communications standards may be implemented by high-speed wireless circuitry 436. In some embodiments, high-speed circuitry 430 may be a system on a chip (SoC) circuit integrated with various functions, which may include video processor functions described above, such that video processor 412 may be integrated with high-speed circuitry 430. In the various embodiments described herein, low-power circuitry 220 and location circuitry 213 are separate from high-speed circuitry 230, in that low-power circuitry 220, location circuitry 213, and high-speed circuitry 230 are separately managed and each able to be placed in a low-power state independently from the other systems.

Memory 434 includes any storage device capable of storing camera data generated by the camera 414 and image processor 412. While memory 434 is shown as integrated with high-speed circuitry 430, in other embodiments, memory 434 may be an independent standalone element of the camera device 410. In certain such embodiments, electrical routing lines may provide a connection through a chip that includes the high-speed processor 432 from the video processor 412 or low-power processor 422 to the memory 434. In other embodiments, the high-speed processor 432 may manage addressing of memory 434 such that the low-power processor 422 will boot the high-speed processor 432 any time that a read or write operation involving memory 434 is needed.

Figure 5:
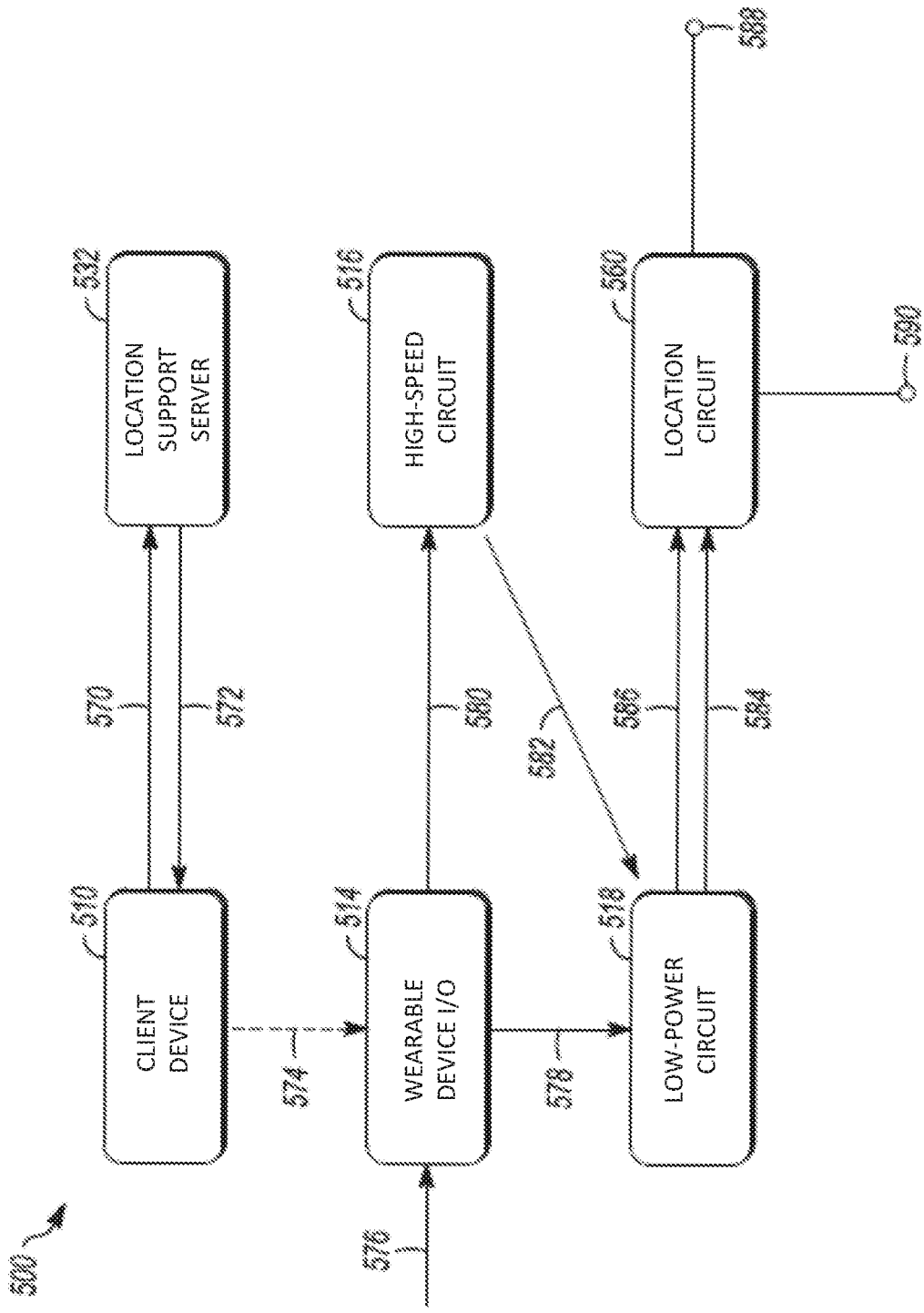
FIG. 5 illustrates aspects of a wearable device, in accordance with some embodiments described herein.

FIG. 5 then illustrates an example system 500 with details on the interactions between various system elements in accordance with some example embodiments. In the embodiment of system 500, a wearable device, a client device 510, and a location support server 532 are illustrated. The wearable device comprises wearable device input/output (I/O) 514, a high-speed circuit 516, a low-power circuit 518, and a location circuit 560. Such device elements may be similar to the corresponding elements of camera device 410 discussed above, and may be used in any wearable device or client companion device 314 of any embodiment described herein.

In some embodiments, operation of system 500 is improved by maximizing the amount of time location circuit 560 spins in a low-power sleep state. In some such embodiments, location circuit 560 has at least four states. The states include an off state, a low-power core sleep state, an attempting sleep state, and an acquiring state. The off state is an operational setting with location circuit 560 completely powered off. In various embodiments, the state is only used when system 500 is in a critical (e.g. near zero) low power state. Booting from this power off state requires additional resources and significantly lowers the time to first fix when location data is needed. The low-power state or sleep state is an operational setting of a very low-power usage but which allows location circuit 560 to maintain a real-time clock. Maintenance of the real-time clock in the low-power state significantly increases performance of the time to first fix for location circuit 560 (e.g. lowers the time from initiation of the fix to acquisition of data). Because of the low-power usage and increased performance, system 500 uses low-power state as the default state for location circuit 560. An attempting sleep state or a transition to low-power state is used when location data has been generated or when a timeout has occurred in the acquisition state. The acquisition state is a high power usage state of location circuit 560 which is used for generating location data for use by system 500. When location circuit 560 enters the acquisition state, the circuit wakes up from the low-power mode and begins attempting a location fix. During this time, location circuit 560 will begin accepting assistance data which helps reduce a time to first fix. Such data may, for example, include information about previous location, as well as Almanack binary data associated with location satellites and location satellite information. If the device successfully acquires location, location parameters will be cached within system memory. After the fix has been acquired and the location parameters cached, or timeout has expired, location circuit 560 automatically enters the attempting sleep state, and then returns to the sleep state (e.g. low-power state) as soon as possible to limit power usage.

In the context of the above states for location circuit 560, the overall system may work with the following flow, in some embodiments. Location circuit 560 remains in the low-power sleep mode until the wearable device triggers a location fix (e.g. from a periodic clock-based trigger or state trigger or from capture of an image or video clip). The client device 510 will periodically grab assistance data from location support server 532. Location assistance data is stored in the memory associated with high-speed circuit 516, and will provide this information to location circuit 560 during location fix operations. During media capture operations, if the media is finished recording, four location parameters are determined as part of location fix operations. The last cached location parameters will be written as metadata for the captured content. If location circuit 560 is able to get a location fix, high-speed circuit 516 will boot and will override previously assigned location parameters for the captured content.

As shown in FIG. 5, client device 510 periodically requests assistance data from location support server 532 in operation 570. Location support server 532 response to client device 510 with any update information in operation 572. This update information may include updates to satellite binary data which enables improved time to first fix operations at location circuit 560. Client device 510 will then periodically check with the paired wearable device in operation 574, and if the wearable device does not have the current assistance data from location support server 532, client device 510 will provide this data to the wearable device via wearable device I/O 514 in operation 574.

The wearable device of system 500 may then be considered to have location manager operations distributed between low-power circuit 518, high-speed circuit 516, and location circuit 560. The core management of the location manager functionality is structured in low-power circuit 518 which is configured for continuous operation unless the wearable device is a critical low power mode. The low-power circuit 518 manages operations of other elements of the wearable device due to low-power consumption as part of the configuration of low-power circuit 518. These operations may include simple neural network or state identification functionality to determine when the wearable device is being worn, to determine other such states of the wearable device which would impact the operation of the location manager functionality. For example, when low-power circuit 518 performs operations which determine that the wearable device is in one state, the low-power circuit 518 may then use a clock trigger to initiate the location fix operation after a threshold period of time since the previous location fix. Such operations may include separate clocks for a previous successful fix in the previous fix attempt. For example, the low-power circuit 518 may initiate a location fix operations 5 minutes after the last fix attempt if that fix attempt was unsuccessful, or 15 minutes after the last fix attempt if the fix attempt was successful. In other embodiments, low-power circuit 518 simply performs a fix attempt at a fixed periodic time while the location manager determines that the device is being worn.

Low-power circuit 518 may also manage location manager functionality in response to inputs received at the wearable device. For example, when a button press input 576 is received at wearable device I/O 514, the signal may be conveyed to low-power circuit 518 in operation 578, and in response to this input 576, low-power circuit 518 manages a location fix operation and instructs location circuit 560 to enter a location acquisition mode in operation 586.

In some embodiments, input 576 via wearable device I/O 514 automatically boots high-speed circuit 516 via operation 580 and the boot operation of high-speed circuitry 516 automatically initiates communication of location assistance binary data or other location assistance data from high-speed circuit 516 to low-power circuit 518 in operation 582. By automatically initiating such communications in response to input that triggers a location fix, the time to first fix is reduced. When low-power circuit 518 initiates the fix and receives the assistance data, the assistance data is forwarded to location circuit 560 in operation 584. This assistance data is further used by location circuit 560 to reduce the time to first fix. Location circuit 560 then performs operations to determine location parameters for the wearable device. These operations may either result in a location fail 588, or a location success 590. After the location fail 588 occurs, an indication may be communicated back to low-power circuit 518, and this information may be used in determining the timing of a subsequent location fix. In some embodiments, if content is being captured in association with the location fix operation, the content may be automatically assigned a previous set of location parameters, and so a location fail 588 will not result in any change to the location data associated with captured content. If location success 590 occurs, the location parameters and various location data generated in this operation is propagated to any recently captured content by the high-speed circuit 516.

Figure 6:
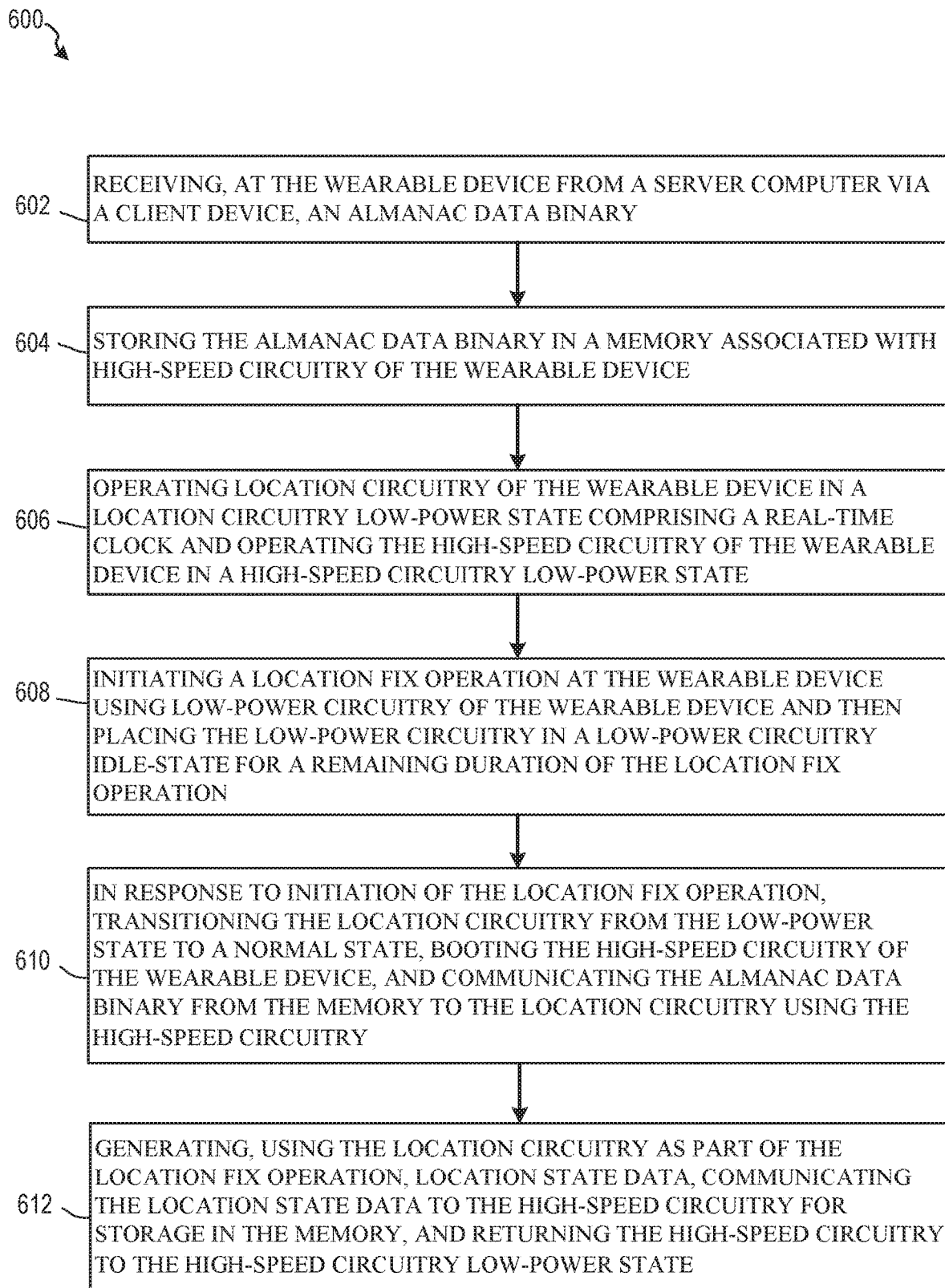
FIG. 6 illustrates an example method, in accordance with some embodiments described herein.

FIG. 6 illustrates an example method in accordance with some embodiments described herein. FIG. 6 particularly describes a method 600 for a system to enable improved device performance for location management in a resource constrained environment, in accordance with some embodiments. In some embodiments, method 600 is performed by a wearable device such as glasses 31 in order to provide location data associated with content captured by a camera device 410 of the glasses 31. In some embodiments, method 600 is embodied in computer-readable instructions stored in a non-transitory storage of a device such as glasses 31, such that when the instructions are executed by one or more processors of a device, the device performs method 600.

Method 600 begins with operation 602 where a wearable device receives an almanac data binary from a location assistance server. Such data may be received via a paired client device 510 using I/O circuitry of the wearable device (e.g. Bluetooth™ low energy, Wifi direct, etc.). In some embodiments, a client device 510 queries the wearable device to determine if an almanac data binary is up to date or has been updated within a threshold time period (e.g. 24 hours, 2 days, 10 hours, etc.), and if the data is not up to date, the updated information is pushed from the client device 510 to the wearable device. In some embodiments, power settings are further queried as part of such an update process, such that the almanac data binary is only updated if the wearable device is above a threshold power level. In some embodiments, a messaging server system, such as the system described in FIG. 1 and in other embodiments described herein, further manages the almanac data binary update. In other embodiments, a client device 510 receives the update data directly from a location assistance server.

When the wearable device receives updated almanac data binary information, that information is stored in operation 604 in a memory associated with high-speed circuitry 430 of the wearable device. Then, a standard operating state of the wearable device in operation 606 involves operating location circuitry 413 of the wearable device in a location circuitry low-power state comprising a real-time clock and operating the high-speed circuitry 430 of the wearable device in a high-speed circuitry low-power state. Operation 608 involves initiating a location fix operation at the wearable device using low-power circuitry 420 of the wearable device and then placing the low-power circuitry 420 in a low-power circuitry idle-state for a remaining duration of the location fix operation. In various embodiments, this location fix operation may be initiated in response to an input indicating capture of image or video data to be associated with location data, or a periodic update associated with a "worn" device state determined based on sensor data.

In response to initiation of the location fix operation, operation 610 then involves transitioning the location circuitry 413 from the low-power state to a normal state, booting the high-speed circuitry 430 of the wearable device, and communicating the almanac data binary from the memory to the location circuitry 413 using the high-speed circuitry 430. Operation 612 then generates using the location circuitry 413 as part of the location fix operation, location state data, communicates the location state data to the high-speed circuitry 430 for storage in the memory, and returns the high-speed circuitry 430 to the high-speed circuitry low-power state.

Some such embodiments operate where the location fix operation is initiated at the wearable device in response to receipt of an input signal at the low-power circuitry 420 from a camera control button of the wearable device. As part of some such operations, the location fix operation may further be initiated at the wearable device in response to a determination that a previous input signal was not received at the low-power circuitry 420 within a threshold period of time.

In some embodiments, the location state data is generated during acquiring mode operations of the location circuitry 413 for a threshold acquiring time period. In various systems, the threshold acquiring time is configured to allow reasonable fix acquisition time without wasting power if a fix is unlikely. Such periods may be based on an average acquisition period dependent upon the location circuitry 413 In some embodiments, the period is between 45 seconds and 90 seconds. In some embodiments, the system tracks an average acquisition time, or another value associated with location fix operations, and selects a threshold acquiring time based on historical data. For example, a system may have a variable acquisition time with a maximum allowable time of 60 seconds, but may identify that 95% of successful location fix operations achieve success within a 30 second time to first fix, and thus use 30 seconds as a timeout threshold for fix operations. If a timeout then occurs with unsuccessful fix operations more than a threshold percentage of the time, the variable location fix timeout threshold may be increased by an incremental value up to the maximum allowable value. Such operations may save power resources at the expense of a lessened chance of a successful location fix in some instances.

In embodiments where the location state data comprises a location fail indication, the system may operate by initiating capture of one or more images using a camera sensor of the wearable device in response to the input signal and associating the one or more images with a previously cached location value in response to the location fail indication. Other systems may operate where location state data comprises a plurality of location parameters, the plurality of location parameters comprising at least a time-to-fix value, an accuracy value, and one or more location values. Some such embodiments operate by initiating capture of one or more images using a camera sensor of the wearable device in response to the input signal and associating the one or more images with the one or more location values.

Figure 7:
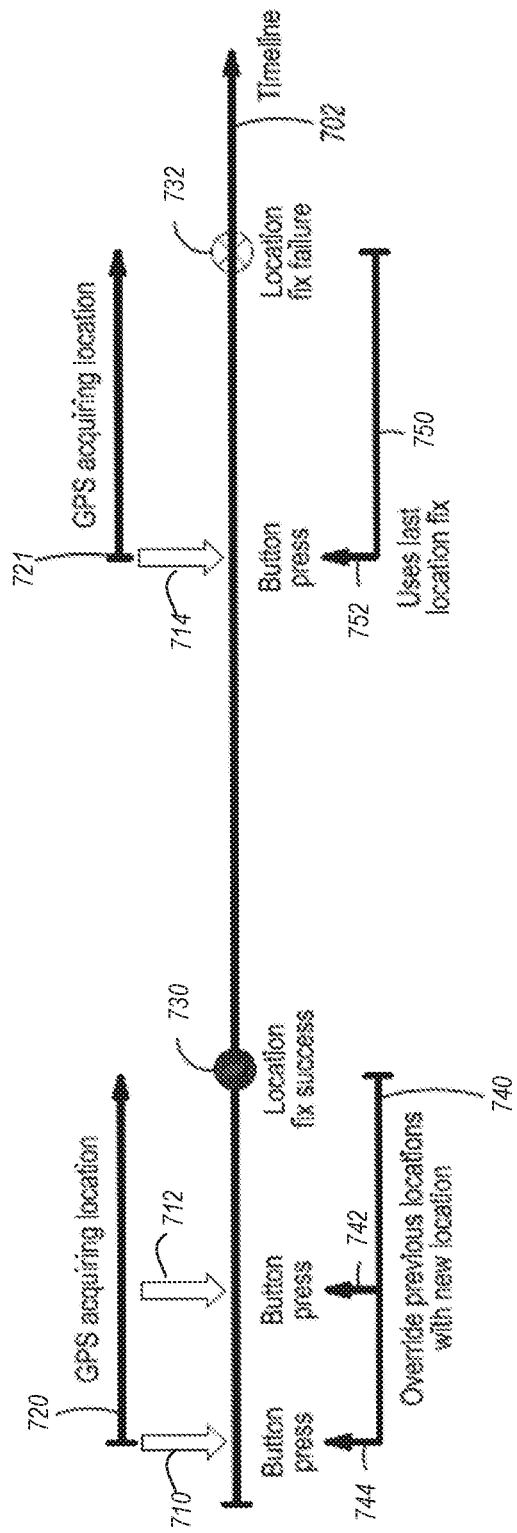
FIG. 7 illustrates aspects of a wearable device location operations, in accordance with some embodiments described herein.

FIG. 7 illustrates aspects of wearable device location operations, in accordance with some embodiments described herein. FIG. 7 particularly illustrates aspects of a location manager responding to button press inputs which initiate content capture at a wearable device during a timeline 702. FIG. 7 shows button press operation 710, 712, and 714. When an initial button press 710 is received, location manager systems enter an acquisition mode 720. For example, location circuit 560 will be placed in a location acquiring state in an embodiment which uses system 500. When the location manager is in an acquisition mode, multiple button press inputs may be received. Subsequent button press operation such as button press 712 will not have any impact on the location acquisition 720. In FIG. 7, location success 730 results in location parameters determined at location success 730 being propagated back to content generated in association with particular button press inputs in operation 740. Content generated in response to button press 710 is thus assigned location parameters from a location success 730 at operation 744, and content generated in response to button press 712 is signed location parameters in operation 742. In some embodiments, the data from location fix success 730 is used for a threshold period of time after the success. For example, if the button press occurs immediately after location success 730, an additional location acquisition fix will not be used, but instead the location parameters from location success 730 will be assigned to content generated in response if this button press occurs within the threshold time. After this threshold time expires, subsequent button presses, such as button press 714, will result in an additional location fix operation in a subsequent location acquisition 721.

As illustrated, button press 714 initiates location acquisition 721. Location failure 732 results from location acquisition 721. Such a failure may be due to various causes such as access satellite location information being blocked or obstructed, interference from other signal sources, or various other such mechanisms. When location failure 732 occurs, operation 750 results in data generated in response to button press 714 being assigned the most recent location parameters in operation 752. In this case, the most recent parameters would be from location success 730. Content generated in response to button press 714 will thus be associated with location parameters from location success 730 until a subsequent location update, if any, provides more accurate location data.

Figure 8:
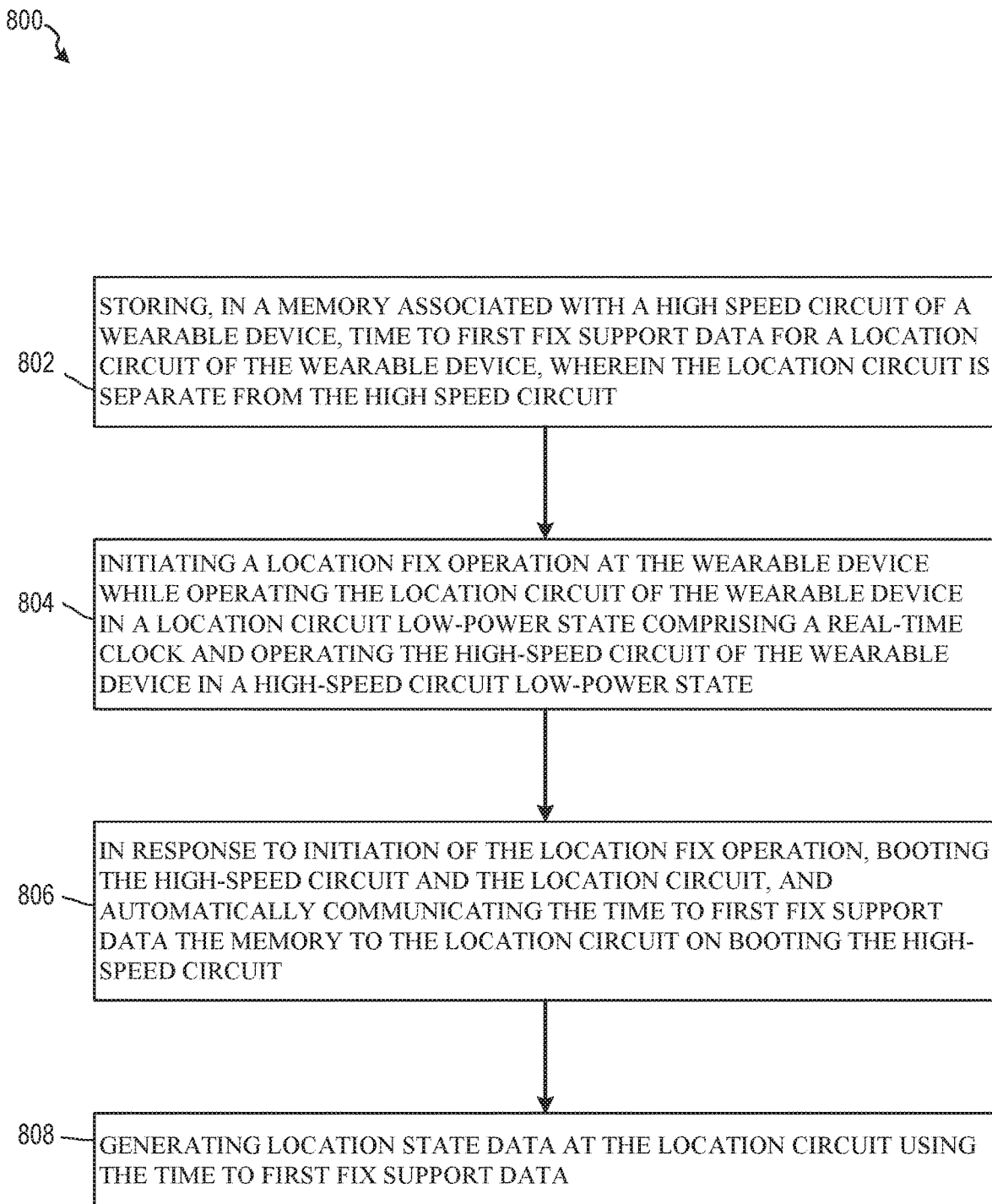
FIG. 8 illustrates an example method, in accordance with some embodiments described herein.

FIG. 8 illustrates an example method, in accordance with some embodiments described herein. FIG. 8 particularly describes a method 800 for reducing a time to first fix in wearable device location operation enabled in accordance with privacy settings of a device. Similar to method 600 above, in some embodiments, method 800 is performed by a wearable device such as glasses 31 in order to provide location data associated with content captured by a camera device 410 of the glasses 31 and, in some embodiments, method 800 is embodied in computer-readable instructions stored in a non-transitory storage of a wearable device which then performs method 800 when the instructions are executed by processing circuitry (e.g. low-power, high-speed, and/or location circuitry 413 of a device).

Method 800 begins with operation 802 for storing, in a memory associated with a high-speed circuit 516 of a wearable device, time to first fix support data for a location circuit 560 of the wearable device, wherein the location circuit 560 is separate from the high-speed circuit 516. As described above, such time to first fix support data may be satellite almanac binary data. In some embodiments, this time to first fix support data may additionally or alternatively involve prior location fix data, country code data, timeout settings, or any other such data to assist a location circuitry 413 in improving performance.

A location fix operation is then initiated at the wearable device in operation 804 while operating the location circuit 560 of the wearable device in a location circuit low-power state comprising a real-time clock and operating the high-speed circuit 516 of the wearable device in a high-speed circuit low-power state. Then in operation 806, in response to initiation of the location fix operation, booting the high-speed circuit 516 and the location circuit 560, and automatically communicating the time to first fix support data in memory to the location circuit 560 on booting the high-speed circuit 516. Location state data at the location circuit 560 uses the time to first fix support data in operation 808.

Various such embodiments may further operate where the first location fix is determined using a first set of accuracy parameters selected for increased time to first fix operation, where the first location fix is a two-dimensional location fix, or where the location circuit 560 maintains the real-time clock without performing any location calculations while operating in the low-power state.

Similarly, various embodiments may operate by returning the high-speed circuit 516 to the high-speed circuit low-power operating state after the time to first fix support data is communicated to the location circuit 560 and before generation of the location state data, and booting the high-speed circuit 516 from the high-speed circuit low-power state after generation of the location state data. Similarly, various such embodiments may operate by returning the location circuit 560 to the low-power state when either a first location fix is determined or a timeout period expires, wherein the location state data comprises either the first location fix or a timeout indicator.

Figure 9:
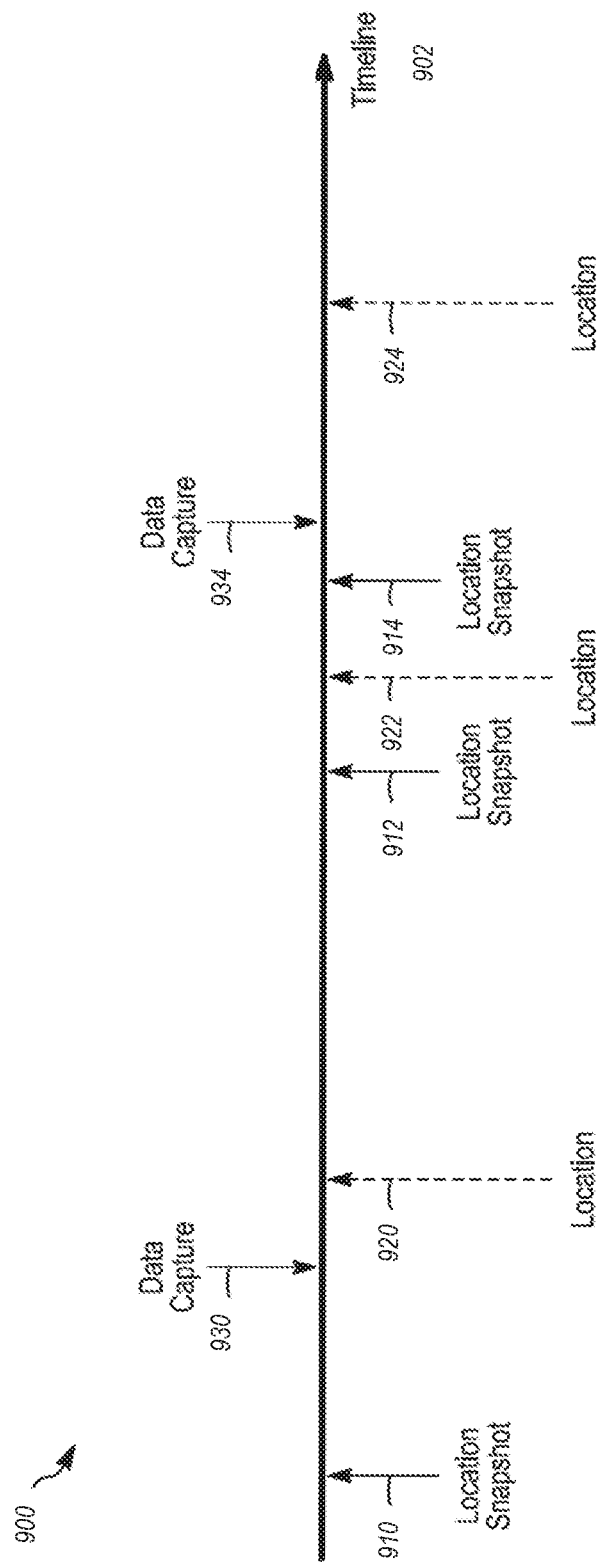
FIG. 9 illustrates aspects of a wearable device location operations, in accordance with some embodiments described herein.

FIG. 9 illustrates aspects of a wearable device location operations and location updates at a paired client device in accordance with some embodiments described herein. When a wearable device is paired with a client device, privacy settings may be checked to determine if the wearable device is authorized to gather location data. In some embodiments, a default or non-paired privacy setting prevents capture of location data, and the wearable device only collects location data when location fix operation are allowed in response to a location set value stored in a non-volatile memory of the wearable device as part of a pairing operation with the client device. In such embodiments, the authorization to gather location data is provided by a user interacting with an application on the client, and the settings on the wearable device are updated during pairing or other communications with the client device.

As described above, rather than continuously updating location information, in order to save battery resources, a wearable device will take location 920, 922, and 924 irregularly depending on various settings and signal availability, while a companion device such as a smartphone is expected to take periodic location snapshots 910, 912, 914 on a regular basis. While the wearable device may attempt to align these location 920, 922, 924 measurements with the capture of associated content, for various reasons, these location measurements may not provide accurate location data for certain content. In some embodiments, the wearable device assigns the most recent location parameters available at the wearable device when the content is captured. In other embodiments, the wearable device assigns location parameters from measurements taken before or after captured of the content based on various criteria that indicate which measurement is more accurate for the content. When the content is later downloaded from a wearable device to a paired client device such as a smart phone, the smartphone may have the ability to associate more accurate location data with the content generated by the wearable device from location snapshots 910, 912, 914. In some situations where the wearable device was not able to capture location data at or near the time of the content capture, the client device can have location data that is more accurate.

For example, system 900 of FIG. 9 shows data capture times 930 and 934 for content captured by the wearable device. Location snapshots 910, 912, 914 are associated with location parameters captured by the associated client device, and location updates 920, 922, 924 are location parameters generated by a wearable device that captured the content and is paired with a client device. When the wearable device downloads content to the client device, the content location can be analyzed and may be updated with the closest location snapshot data from the client device if that location information is determined to be more accurate than the location information from the wearable device. In the example of FIG. 9, content actually captured at the capture time 934 may be associated with location measurement 922 made by the wearable device. When the content is downloaded to the client device, the client device may generate a timeline 902 to determine if the client device has more accurate location data to associate with the downloaded content. The content captured at data capture time 930, for example, occurred closer in time to the location update 920 which occurred at the client device 510 than to the time of location snapshot 910 or any previous location measurement at the wearable device. The proximity of the later data capture time 930 can thus be used to set a location from location update 920 as associated with that content, rather than a location from location snapshot 910. For content captured at capture time 934, since the time of location snapshot 914 is closer to data capture time 934 then the time of location measurements 924 or 922, the location data associated with the content from data capture time 934 can be updated at the client device to the location data from the client device at location snapshot 914.

In various embodiments, other state data associated with the wearable device or the client device can be used to determine which location data to associate with captured content. For example, location snapshot 914 and location measurements 922, 924 may additionally be associated with motion information. If location snapshot 914 indicates that the client device was traveling at high-speed at the time of location update 934, and other data from the wearable device is available to indicate that the wearable device was not traveling at high-speed at data capture time 934 or the time of location measurement 924, the client device may determine that location measurement 924 is more likely to provide accurate location information for the content associated with data capture time 934.

Figure 10:
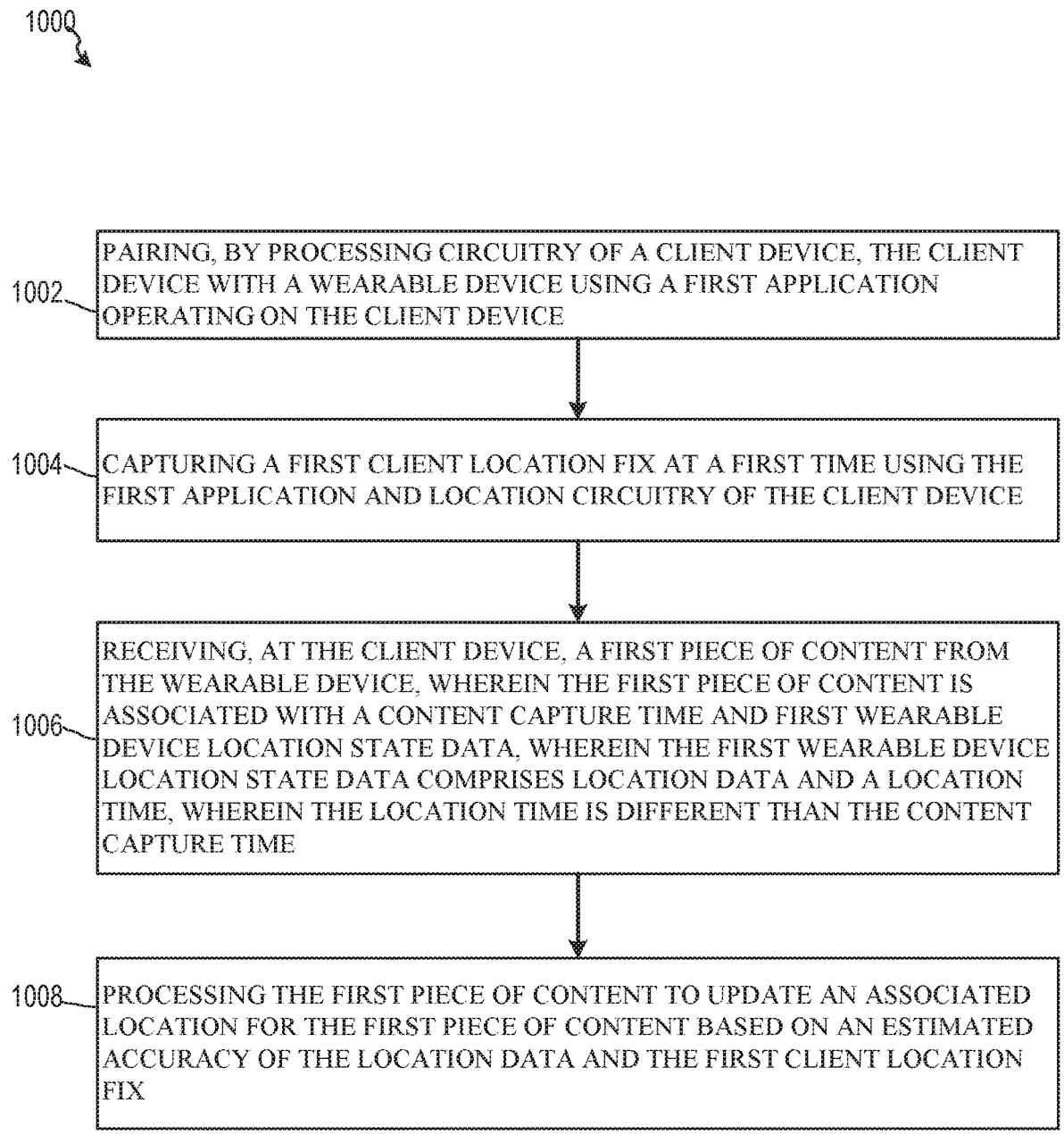
FIG. 10 illustrates an example method, in accordance with some embodiments described herein.

FIG. 10 illustrates an example method, in accordance with some embodiments described herein. FIG. 10 particularly describes a method 1000 for reconciling location data associated with content to improve the accuracy of the associated location data and reduce power consumption in associated wearable device operations. Method 1000 may involve operations at a client device 510 paired with or otherwise associated with a wearable device such as wearable device 31 or any other such client companion device 314 described herein. In some embodiments, method 1000 is embodied in computer-readable instructions stored in a non-transitory storage of a client device 510 that performs method 1000 when the instructions are executed by processing circuitry of the client device 510.

Method 1000 begins with operation 1002 pairing, by processing circuitry of a client device 510, the client device 510 with a wearable device 31 using a first application operating on the client device 510. During operations of an application associated with a wearable device 31, or other such operations at the client device 510, operation 1004 involves capturing a first client location fix at a first time using the first application and location circuitry 413 of the client device 510. Limiting such operations for location to the operation of an application protects user privacy and allows a user certainty over collection of location data associated with the wearable device 31 to privacy settings associated with the application. While such limitations provide less accurate location data, they improve user privacy as well as limiting location services based power usage.

Operation 1006 then involves receiving, at the client device 510, a first piece of content from the wearable device 31, where the first piece of content is associated with a content capture time and first wearable device location state data, where the first wearable device location state data comprises location data and a location time, and where the location time is different than the content capture time. As described above, periodic location capture at the wearable device 31 allows improved battery performance, but lowers location accuracy. Because of the pairing between the wearable device 31 and the client device 510, the system may make assumptions about the proximity of the wearable device 31 and the client device 510. In some embodiments, state data generated at the wearable device 31 and/or the client device 510 may be used to validate this assumption, and to further improve accuracy estimates regarding the best location data to associate with content captured using a wearable device 31. Operation 1008 then involves processing the first piece of content to update an associated location for the first piece of content based on an estimated accuracy of the location data and the first client location fix.

In some embodiments, the estimated accuracy of the location data is based on a time proximity of the content capture time to the location time and the first time, some such embodiments involve generating a location flag when the time proximity is greater than a time threshold. Some such embodiments involve a velocity value as part of a client location fix. In some such embodiments, the first piece of content is further associated with a first set of motion data, where the client device 510 is associated with a second set of motion data comprising the velocity value, and where the estimated accuracy is further based on the first set of motion data and the second set of motion data. State data may further be involved in the estimated accuracy. For example, inertia sensor data or light sensor data may be provided and used to determine a state of a wearable device 31 at various times. Similar data may be used to determine a state of a client device 510 when an application associated with the wearable device 31 is running. Comparisons of state data may be used to further estimate the accuracy of location data, or to otherwise determine the best location data to associate with particular content. For example, if state data at a client device 510 indicates "traveling" or "driving" and then indicates "stationary", content captured after the state transitions to "stationary" may be more likely to be associated with location data determined after the "stationary" state begins than during the "traveling" state, even if the time difference between the content capture time and a location determined during the "traveling" state is less than a time difference between the content capture time and a later location determined during the "stationary" state. Thus, if a client device 510 determines a first location fix during a "driving" state, 5 minutes elapses, content is captured at a wearable device 31 at roughly the same time a state changes from "driving" to "stationary" but no location fix success occurs and then, 10 minutes elapses before another second location fix occurs, the captured content may be associated with the second location fix rather than the first location fix due to the state data.

In some embodiments, the first client location fix is initiated upon booting of the application using the processing circuitry of the client device 510. Some embodiments involve periodically performing client location fix operations using the location circuitry 413 of the client device 510 while the application is operating on the client device 510, and receiving, at the client device 510, a plurality of pieces of content from the wearable device 31, where each piece of content of the plurality of pieces of content is associated with a corresponding content capture time and associated wearable device location state data. Then, for each piece of content, the method involves comparing the associated wearable device location state data with the client location fix operations to update an associated location. In some such embodiments, the associated location for each piece of content is selected as a location of the client fix operations or the associated wearable device location state data based on an associated time difference with the corresponding content capture time for each piece of content. Each piece of content is then stored in a memory of the client device 510 with the associated location as determined based on the associated time difference with the corresponding capture time.

As described above, various different operations are involved in methods 600, 800, and 1000. Even though specific operations are described in specific orders, other embodiments are possible with repeated operations and intervening operations, and combinations of the various operations of different methods are possible within other different embodiments. It will, therefore, be apparent that additional methods are possible using the described operations or similar operations within the possible scope of the innovations described herein in order to improve the power performance of wearable devices 31 in association with location services provided by the wearable device 31 and paired client devices 510.

Figure 11:
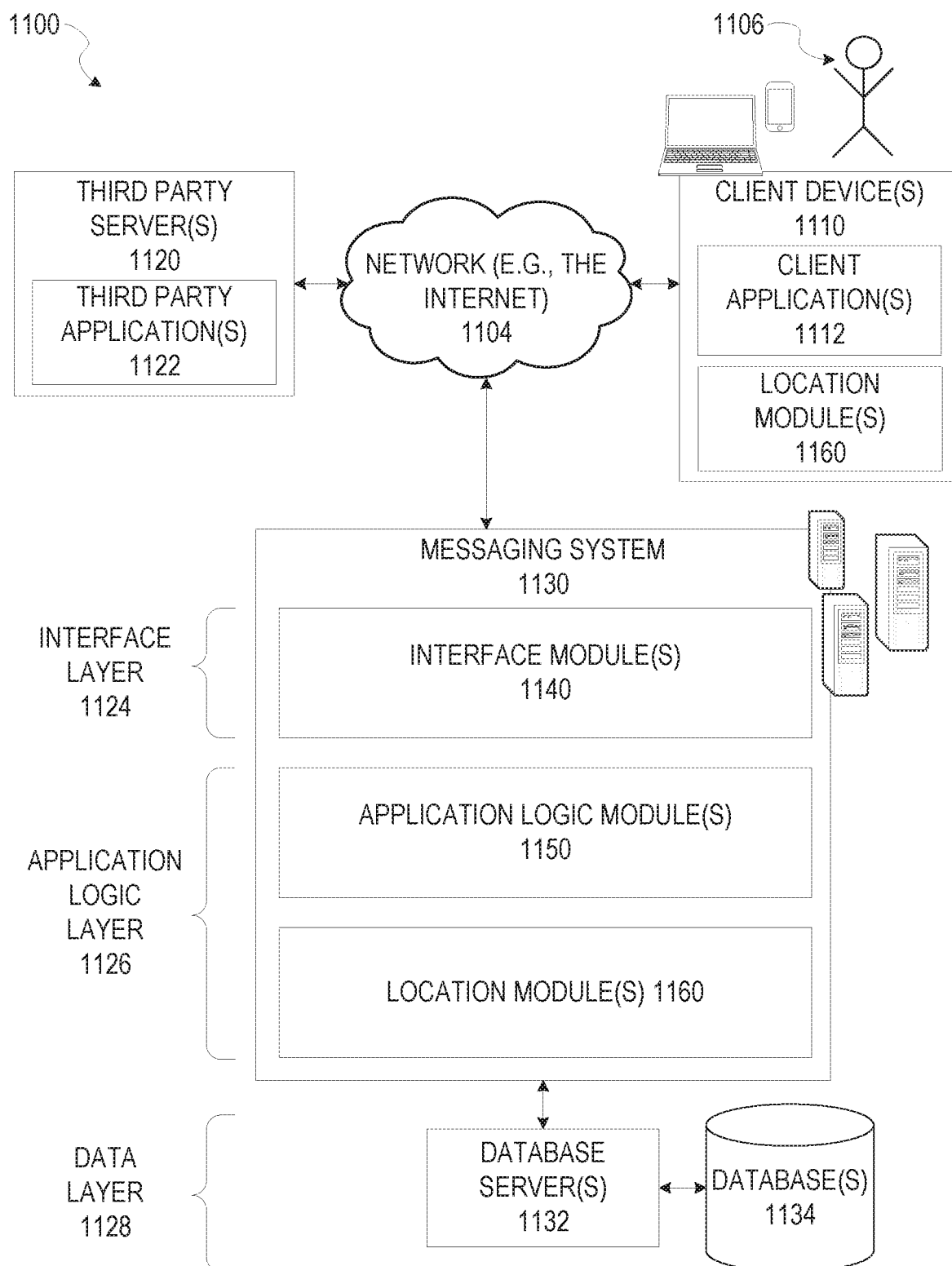
FIG. 11 illustrates aspects of a communication environment for wearable device operation in conjunction with associated client devices and supporting server computer systems, in accordance with some embodiments.

FIG. 11 is a network diagram depicting a network system 1100 having a client-server architecture configured for exchanging data over a network 495, which may be used with wearable devices 31, according to some embodiments. For example, the network system 1100 may be a messaging system 330 where clients communicate and exchange data within the network system 1100, where certain data is communicated to and from wearable devices 31 described herein. The data may pertain to various functions and aspects associated with the network system 1100 and its users. Although the network system 1100 is illustrated herein as having a client-server architecture, other embodiments may include other network architectures, such as peer-to-peer or distributed network environments.

As shown in FIG. 11, the network system 1100 includes a messaging system 1130. The messaging system 1130 is generally based on a three-tiered architecture, consisting of an interface layer 1124, an application logic layer 1126, and a data layer 1128. As is understood by skilled artisans in the relevant computer and Internet-related arts, each module or engine shown in FIG. 11 represents a set of executable software instructions and the corresponding hardware (e.g., memory and processor) for executing the instructions. In various embodiments, additional functional modules and engines may be used with a messaging system 1130, such as that illustrated in FIG. 11, to facilitate additional functionality that is not specifically described herein. Furthermore, the various functional modules and engines depicted in FIG.

11 may reside on a single server computer, or may be distributed across several server computers in various arrangements. Moreover, although the messaging system 1130 is depicted in FIG. 11 as having a three-tiered architecture, the inventive subject matter is by no means limited to such an architecture.

As shown in FIG. 11, the interface layer 1124 consists of interface modules (e.g., a web server) 1140, which receive requests from various client-computing devices and servers, such as client devices 1110 executing client applications 1112, and third-party servers 1120 executing third-party applications 1122. In response to received requests, the interface modules 1140 communicate appropriate responses to requesting devices via a network 1104. For example, the interface modules 1140 can receive requests such as Hypertext Transfer Protocol (HTTP) requests, or other web-based application programming interface (API) requests.

The client devices 1110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 1110 are executing the client applications 1112. The client applications 1112 can provide functionality to present information to a user 1106 and communicate via the network 1104 to exchange information with the messaging system 1130. Each of the client devices 1110 can comprise a computing device that includes at least a display 411 and communication capabilities with the network 1104 to access the messaging system 1130. The client devices 1110 comprise, but are not limited to, remote devices, work stations, computers 61, general-purpose computers. Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The users 1106 can include a person, a machine, or other means of interacting with the client devices 1110. In some embodiments, the users 1106 interact with the messaging system 1130 via the client devices 1110.

As shown in FIG. 11, the data layer 1128 has one or more database servers 1132 that facilitate access to information storage repositories or databases 1134. The databases 1134 are storage devices that store data such as member profile data, social graph data (e.g., relationships between members of the messaging system 1130), and other user data.

An individual can register with the messaging system 1130 to become a member of the messaging system 1130. Once registered, a member can form social network relationships (e.g., friends, followers, or contacts) on the messaging system 1130 and interact with a broad range of applications provided by the messaging system 1130.

The application logic layer 1126 includes various application logic modules 1150, which, in conjunction with the interface modules 1140, generate various user interfaces with data retrieved from various data sources or data services in the data layer 1128. Individual application logic modules 1150 may be used to implement the functionality associated with various applications, services, and features of the messaging system 1130. For instance, a messaging application can be implemented with one or more of the application logic modules 1150. The messaging application provides a messaging mechanism for users 1106 of the client devices 1110 to send and receive messages that include text and media content such as pictures and video. The client devices 1110 may access and view the messages from the messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 1150.

Example Machine and Hardware Components

The example electronic devices described above may incorporate various computer components or machine elements, at least some of which are configured for performing automated operations and/or for automatically providing various functionalities. These include, for example, automated image data processing and image-capture parameter adjustment, as described. The glasses 31 may thus provide an independent computer system. Instead. or in addition, the glasses 31 may form part of a distributed system including one or more off-board processors and/or devices.

Figure 12:
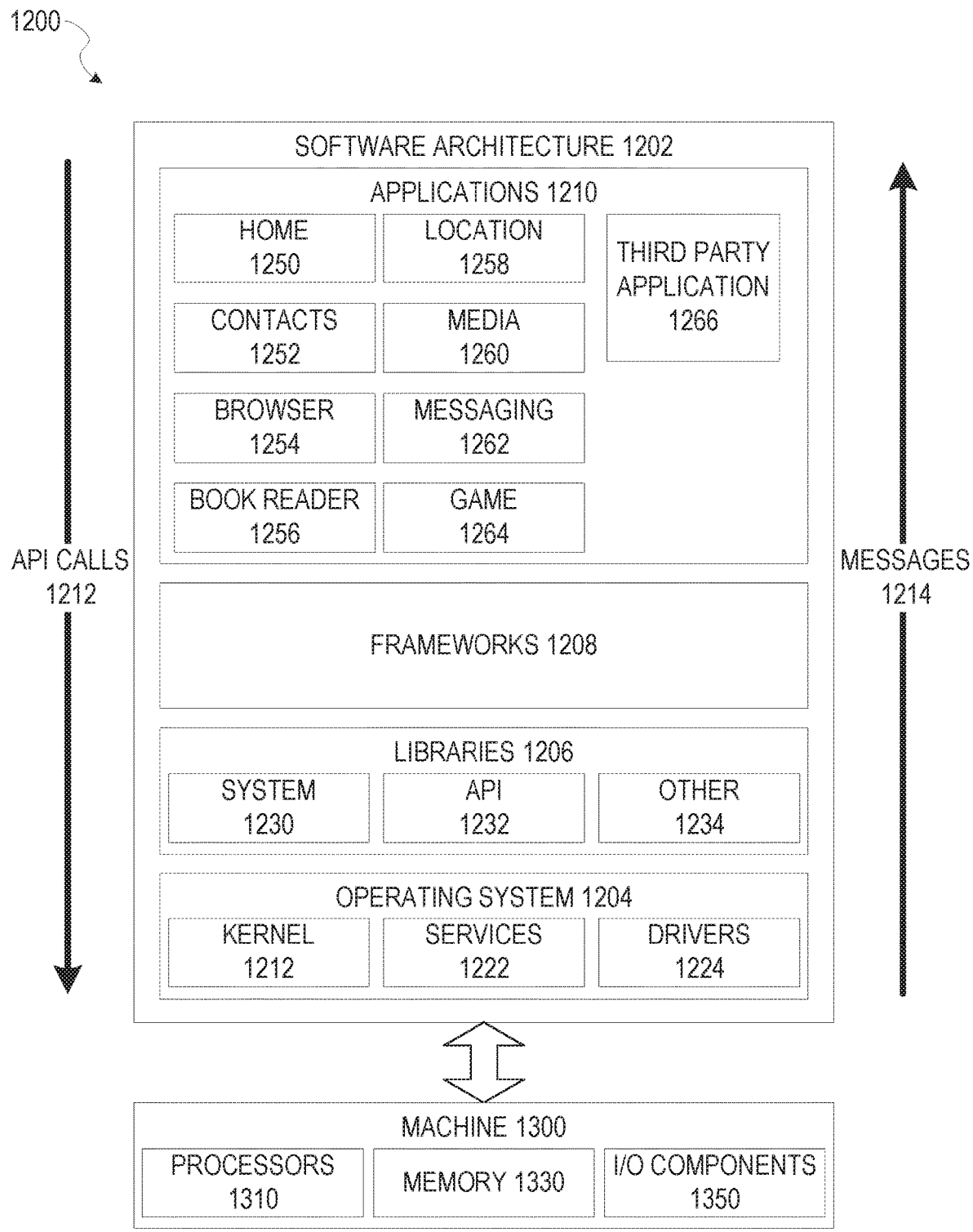
FIG. 12 is a block diagram illustrating an example of a software architecture that may be installed on a machine, according to some example embodiments.

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as a machine 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments. In various embodiments, any client device 510, server computer of a server system 498, or other device described herein may operate using elements of the software 1202. Devices such as the camera controller 134 and other components of the portable electronic devices, as described earlier, may additionally be implemented using aspects of the software 1202.

In various implementations, the operating system 1204 manages hardware resources and provides common services. The operating system 1204 includes, for example, a kernel 1212, services 1222, and drivers 1224. The kernel 1212 acts as an abstraction layer between the hardware and the other software layers, consistent with some embodiments. For example, the kernel 1212 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth. In certain implementations of a device such as the camera controller 134 of the glasses 31, low-power circuitry 420 may operate using drivers 1224 that only contain BLUETOOTH® Low Energy drivers and basic logic for managing communications and controlling other devices, with other drivers operating with high-speed circuitry 430.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display 411), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application 1266 can invoke the API calls 1212 provided by the operating system 1204 to facilitate functionality described herein.

Embodiments described herein may particularly interact with any application or application module which includes the use of location operations in a resource limited environment, such that it is not feasible to continuously monitor and update a device location. Instead, a specific application 1210 may include location services as part of an application operating on a wearable device 31, or an application 1210 may support location operations at a client device 1110 for location services provided in conjunction with a companion device or wearable device 31 with resource limitations.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor 1310. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1310 configured by software to become a special-purpose processor, the general-purpose processor 1310 may be configured as respectively different special-purpose processors (e.g., comprising different hardware modules) at different times. Software can accordingly configure a particular processor or processors 1310, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors 1310 that are temporarily configured (e.g., by software) or permanently configured to perform the relevant operations. Whether temporarily or permanently configured, such processors 1310 constitute processor-implemented modules that operate to perform one or more operations or functions described herein. As used herein. "processor-implemented module" refers to a hardware module implemented using one or more processors 1310.

Similarly, the methods described herein can be at least partially processor-implemented, with a particular processor or processors 1310 being an example of hardware. For example, at least some of the operations of a method can be performed by one or more processors 1310 or processor-implemented modules. Moreover, the one or more processors 1310 may also operate to support performance of the relevant operations in a "cloud computing" environment or as a "software as a service" (SaaS). For example, at least some of the operations may be performed by a group of computers 61 (as examples of machines including processors 1310), with these operations being accessible via a network 1104 (e.g., the Internet) and via one or more appropriate interfaces (e.g., an API). In certain embodiments, for example, a client device 1110 may relay or operate in communication with cloud computing systems, and may store media content such as images or videos generated by devices described herein in a cloud environment.

The performance of certain of the operations may be distributed among the processors 1310, not only residing within a single machine, but deployed across a number of machines. In some example embodiments, the processors 1310 or processor-implemented modules are located in a single geographic location (e.g., within a home environment, an office environment, or a server farm). In other example embodiments, the processors 1310 or processor-implemented modules are distributed across a number of geographic locations.

Figure 13:
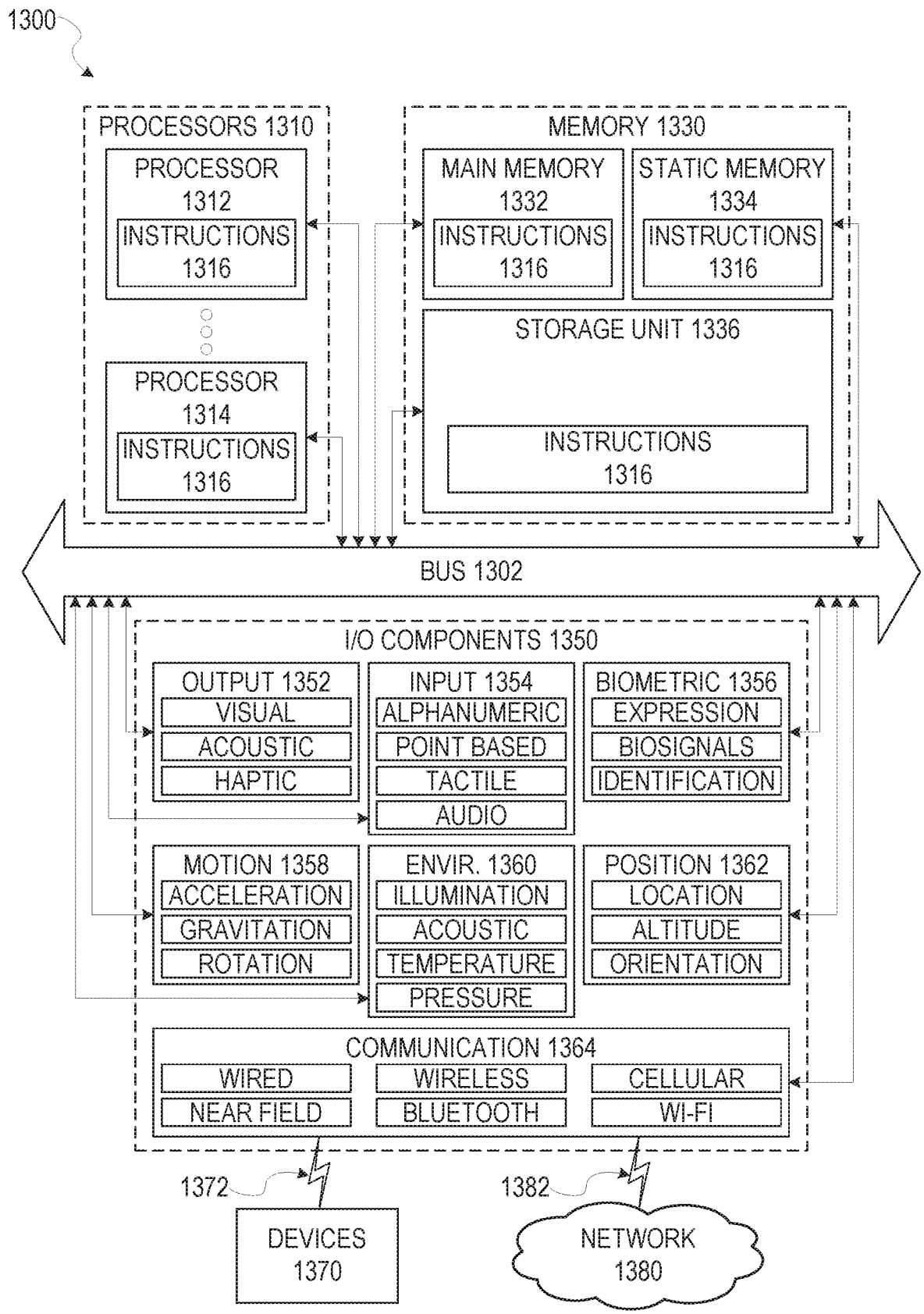
FIG. 13 illustrates a diagrammatic representation of a machine in the form of a computer system within which a set of instructions may be executed for causing the machine to perform any one or more of the methodologies discussed herein, according to some example embodiments.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically. FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device 31 (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1312 with a single core, a single processor 1312 with multiple cores (e.g., a multi-core processor), multiple processors 1310 with a single core, multiple processors 1310 with multiple cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., the instructions 1316) for execution by a machine (e.g., the machine 1300), such that the instructions 1316, when executed by one or more processors of the machine 1300 (e.g., the processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display 411 such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, the communication components 1364 include wired communication components, wireless communication components, cellular communication components, near field communication (NFC) components. BLUETOOTH® components (e.g., BLUETOOTH® Low Energy). WI-FI® components, and other communication components to provide communication via other modalities. The devices 1370 may be another machine 1300 or any of a wide variety of peripheral devices (e.g., a peripheral device coupled via a USB).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code. Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting an BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., HTTP). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method performed on a mobile device, the method comprising:
   receiving, at a higher-speed circuitry via a wireless connection, location support data;
   storing the location support data in a memory associated with the higher-speed circuitry;
   in response to initiation of a location operation, a lower-power circuitry, booting the higher-speed circuitry to operate in a higher-power state and the higher-power circuitry causing the location support data to be communicated to location circuitry, the location circuit being separate from the higher-speed circuitry and the lower-power circuitry; and
   determining, by the location circuitry, the location state data using the location support data and information from a real-time clock, wherein the location circuitry operates in a location circuit lower-power state.

2. The method of claim 1, wherein the mobile device is a wearable device.

3. The method of claim 1, wherein the location support data comprises satellite almanac binary data associated with location satellites.

4. The method of claim 3, wherein the location support data comprises a previous location of the location satellites.

5. The method of claim 1, wherein the location support data comprises a general location of the mobile device.

6. The method of claim 1 further comprising:
   in response to the initiation of the location operation, booting the location circuitry to operate in a higher-power state.

7. The method of claim 1 further comprising:
   in response to the initiation of the location operation, retrieving additional location support data by the higher speed circuitry.

8. The method of claim 1 further comprising:
   returning the location circuit to the location circuitry lower-power state when the location state data is determined.

9. The method of claim 1, wherein the location state data comprises an indication of the location of the mobile device or a timeout indication.

10. The method of claim 9, wherein the indication of the location of the mobile device comprises a two-dimensional location fix.

11. The method of claim 1 further comprising:
    in response to capturing an image, initiate the location operation.

12. The method of claim 1, wherein the location support data is received from a client device.

13. A mobile device comprising:
- higher-speed circuitry configured to receive via a wireless connection location support data;
- a memory coupled to the higher-speed circuitry of the mobile device, the memory configured to store the location support data;
- location circuitry configured to generate location state data, wherein the location circuitry is separate from the higher-speed circuitry;
- lower-power circuitry coupled to the higher-speed circuitry and the location circuitry configured to:
  - in response to initiation of a location operation, booting the higher-speed circuit to operate in a higher-power state and causing the location support data to be communicated to the location circuitry using the higher-speed circuit, the location circuit being separate from the higher-speed circuit and the lower-power circuit; and
  - initiate generation of the location support data at the location support circuitry using the location support data, wherein the location circuitry operates in a location circuit lower-power state.

14. The mobile device of claim 13, wherein the location support data comprises satellite almanac binary data associated with location satellites.

15. A non-transitory computer readable medium comprising instructions that, when executed by circuitry of a wearable device, cause the wearable device to perform operations comprising:
- receive, at a higher-speed circuitry via a wireless connection, location support data;
- store the location support data in a memory associated with the higher-speed circuit;
- in response to the initiation of the location operation, booting the higher-speed circuit to operate in a higher-power state and causing the location support data to be communicated to the location circuitry using the higher-speed circuit; and
- determining, by the location circuitry, the location state data using the location support data and information from a real-time clock, wherein the location circuitry operates in a location circuit lower-power state.

16. The non-transitory computer readable medium of claim 15, wherein the location support data comprises satellite almanac binary data associated with location satellites.

* * * * *